W. J. SLEFFEL.
COMBINED FRONT GEAR AND STEERING CONNECTION FOR CHILDREN'S VEHICLES.
APPLICATION FILED SEPT. 28, 1914.
1,156,023.
Patented Oct. 5, 1915.
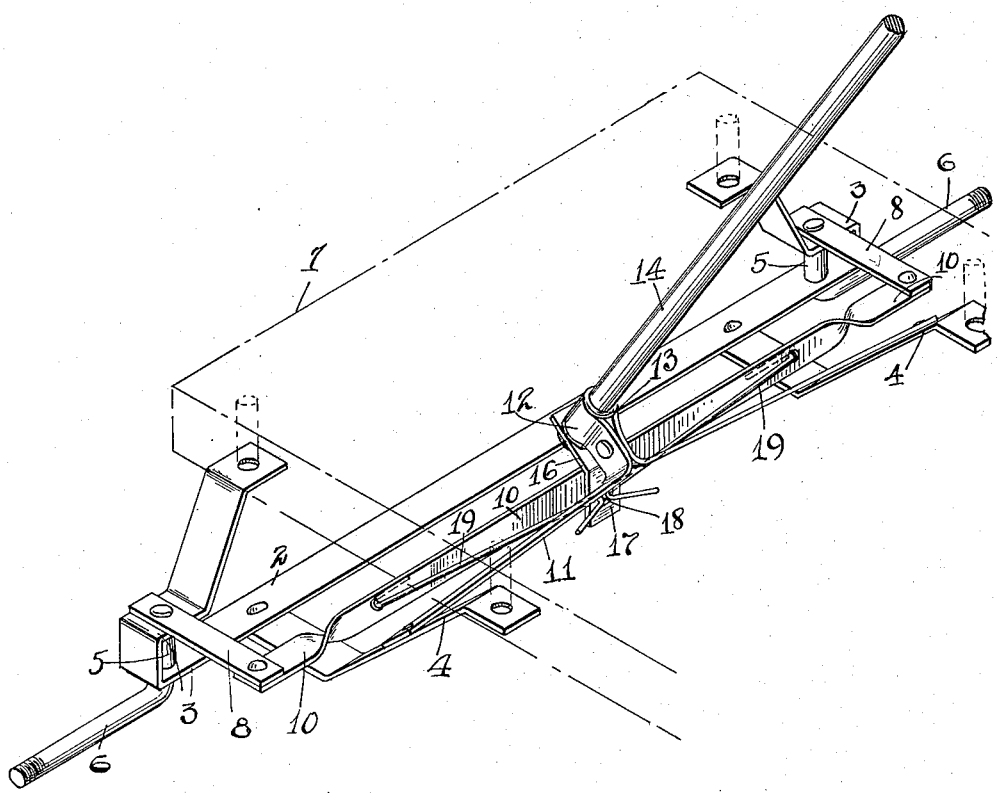
WITNESSES=
OM Kappler.
H. D. Fay.
INVENTOR
William J. Sleffel
By Fay & Oberlin
ATTORNEYS

UNITED STATES PATENT OFFICE.

WILLIAM J. SLEFFEL, OF CLEVELAND, OHIO, ASSIGNOR TO THE KIRK-LATTY MANUFACTURING COMPANY, OF CLEVELAND, OHIO, A CORPORATION OF OHIO.

COMBINED FRONT GEAR AND STEERING CONNECTION FOR CHILDREN'S VEHICLES.

1,156,023.

Specification of Letters Patent.

Patented Oct. 5, 1915.

Application filed September 28, 1914. Serial No. 863,816.

*To all whom it may concern:*

Be it known that I, WILLIAM J. SLEFFEL, a citizen of the United States, and a resident of Cleveland, county of Cuyahoga, State of Ohio, have invented a new and useful Improvement in Combined Front Gear and Steering Connection for Children's Vehicles, of which the following is a specification, the principle of the invention being herein explained and the best mode in which I have contemplated applying that principle, so as to distinguish it from other inventions.

The subject of the present invention is a combined front gear and steering connection for children's vehicles such as wagons, miniature "automobiles", and the like. In such vehicles it is desirable to make the construction as simple and still as convenient to operate as possible since the strength of the operators must be taken into consideration as well as the cost of the vehicles. In such vehicles it is also essential to construct the same to resemble as nearly as possible an actual automobile since the same are more readily sold. If the usual steering gear is retained the vehicle does not resemble an automobile in this particular, and it is for this purpose that I have designed the present invention, which possesses an "automobile" steering gear of a new type which is not only simple to construct but easily operated.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing the single figure there appearing shows in perspective a view of the front portion of the vehicle body in which my invention has been incorporated.

In the figure, which is a view from above, there is shown the bottom portion 1 of the vehicle to which is attached a transversely extending bracket or frame portion 2 such frame having at either side spaced parallel members 3 having vertically alined apertures. Such frame is supported against longitudinal thrust by means of supports 4 extending downwardly from suitable points on the body. Pivotally mounted in the alined apertures in either side of the frame member 2, are rods 5 bent to provide horizontal extending portions or wheel spindles 6 for the mounting of the wheels on the vehicle. Such rods 6 are attached at the point that they extend from the frame member 2 to short connecting links 8 which are attached at their other ends to a single transversely extending link 10. The connecting links 8 are held in parallel position by the connecting link 10 and when in such position the spindle portion 6 of the rods 5 are either alined or parallel.

Extending between the brackets 4 is a strap 11 formed with a loop 12 at its center which receives a bushing or sleeve 13 constituting a bearing in which is rotatably mounted a steering column 14, such column extending upwardly through a suitable aperture in the bottom of the vehicle at an angle to the horizontal. It will be understood that usually a steering wheel or lever will be attached to the upper end of the steering column. At the lower end of the steering column there is fixedly attached thereto a short bar or link 16 extending at substantially right angles to said column and being bent at its outer end 17 so that such end lies substantially parallel to the transverse link 10. An aperture 18 is formed in such bent end portion of such bar and inserted in such aperture are two flexible connecting rods here shown in the form of wires 19 which extend away from said bar 16 parallel to said transverse link and connected to the same at points widely separated from the center thereof. The purpose of such relatively flexible connections between the said bar and the said transverse link is to allow for the movement of the same as the bar and link do not remain parallel when the steering column is rotated and by using relatively flexible and loose connections between these two members, it is possible to provide a comparatively cheap but strong construction which has all the advantages of the steering control generally used on automobiles together with the simplicity in number of parts which must be secured in vehicles of this type.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a children's vehicle, the combination of a frame having two spaced horizontal members at each side, each such two members having vertically alined apertures therein, front wheel spindles having bent up ends pivotally received in such alined apertures, short links attached to such bent up ends of said spindles, a flat transverse link connecting said short links, said spindles and links being so connected that said spindles remain always either in alinement or parallelism and said links in parallelism, a steering column at an angle to the horizontal and at right angles to said transverse link, a flat bar attached to the lower end of said steering column and having its free end bent to lie normally substantially parallel to said transverse link, and relatively flexible connections extending from such free end of said bar to either end of said transverse link and said connections having a slight amount of lost motion at each point of attachment.

Signed by me, this 25th day of Sept. 1914.

WILLIAM J. SLEFFEL.

Attested by—
PHILLIP J. GIBBONS,
HAROLD K. RICE.

Copies of this patent may be obtained for five cents each, by addressing the "Commissioner of Patents, Washington, D. C."